United States Patent
Finn et al.

(10) Patent No.: US 10,113,325 B1
(45) Date of Patent: Oct. 30, 2018

(54) GENERATOR ENCLOSURE SYSTEM

(71) Applicant: Kohler Co., Kohler, WI (US)

(72) Inventors: Bryan J. Finn, Cascade, WI (US); Ken R. Miller, Sheboygan, WI (US); Justin W. Lodes, New Holstein, WI (US); Gary F. Reif, Sheboygan, WI (US)

(73) Assignee: Kohler Co., Kohler, WI (US)

( * ) Notice: Subject to any disclaimer, the term of this patent is extended or adjusted under 35 U.S.C. 154(b) by 0 days.

(21) Appl. No.: 15/491,504

(22) Filed: Apr. 19, 2017

(51) Int. Cl.
| | |
|---|---|
| E04H 1/12 | (2006.01) |
| H02K 7/18 | (2006.01) |
| F16M 5/00 | (2006.01) |
| F16M 7/00 | (2006.01) |
| F16B 5/00 | (2006.01) |
| F16M 1/00 | (2006.01) |

(52) U.S. Cl.
CPC ......... *E04H 1/1238* (2013.01); *F16B 5/0084* (2013.01); *F16M 1/00* (2013.01); *F16M 5/00* (2013.01); *F16M 7/00* (2013.01); *H02K 7/1815* (2013.01)

(58) Field of Classification Search
CPC .................................................. H01L 2224/16
USPC ....................................................... 174/520
See application file for complete search history.

(56) References Cited

U.S. PATENT DOCUMENTS

| | | | |
|---|---|---|---|
| 1,925,327 A * | 9/1933 | Klopp ..................... | E05D 15/00 |
| | | | 292/147 |
| 2,751,635 A | 6/1956 | Donnahue | |
| 3,458,242 A | 7/1969 | Williams | |
| 3,683,427 A | 8/1972 | Burkholz et al. | |
| 4,467,572 A | 8/1984 | Somers et al. | |
| 4,835,405 A | 5/1989 | Clancey et al. | |
| 5,033,493 A | 7/1991 | Senchuck | |
| 5,558,112 A | 9/1996 | Strieter | |
| 5,734,148 A | 3/1998 | Latvis et al. | |
| 7,411,153 B2 | 8/2008 | Radtke | |
| 8,429,857 B2 | 4/2013 | Melrose et al. | |
| 8,456,814 B2 * | 6/2013 | Gerovac .................. | H02B 1/38 |
| | | | 174/50 |
| 9,181,865 B2 | 11/2015 | Richardson et al. | |
| 2004/0004812 A1 | 1/2004 | Curlee et al. | |
| 2004/0178182 A1 * | 9/2004 | Radtke ..................... | B23K 9/10 |
| | | | 219/130.1 |
| 2012/0033358 A1 | 2/2012 | Chen et al. | |
| 2012/0052268 A1 * | 3/2012 | Axisa ................ | H01L 23/49838 |
| | | | 428/212 |
| 2013/0016456 A1 | 1/2013 | Lindholm et al. | |
| 2014/0140020 A1 * | 5/2014 | Rogers ................ | H01L 21/4867 |
| | | | 361/749 |
| 2016/0167155 A1 | 6/2016 | Dessart | |

* cited by examiner

*Primary Examiner* — Hoa C Nguyen
*Assistant Examiner* — Stanley Tso
(74) *Attorney, Agent, or Firm* — Lempia Summerfield Katz LLC

(57) ABSTRACT

A generator enclosure system provides for tool-less removal of protective panels. The panels are configured to lock in place and unlock by a technician using only their hands. Side panels interlock with front and back panels. At least the front panel may be removed by actuating, by hand, a lever on a locking mechanism and lifting the panels up and away from the generator enclosure system.

14 Claims, 16 Drawing Sheets

US 10,113,325 B1

GENERATOR ENCLOSURE SYSTEM

TECHNICAL FIELD

This disclosure relates in general to a generator enclosure system, or more particularly, an enclosure system utilizing removable panels that may be removed and attached by hand, and without the use of tools to form a unitary enclosure for a generator system.

BACKGROUND

Generators are used in a variety of applications to provide electrical power when power from a power grid is unavailable or not wanted. Generators may be used in both commercial and residential settings. In both instances the generator may be placed outside of a building structure. As a result, the generator is subject to the elements. In order to protect a generator system from the weather elements, enclosures are used. Various generators may include different enclosure configurations of external structures and panels. In most instances, tools are required to remove exterior panels to access the generator. Generator enclosure designs do not facilitate tool-less removal of panels in a generator enclosure system with internal structural elements.

BRIEF DESCRIPTION OF THE DRAWINGS

Exemplary embodiments are described herein with reference to the following drawings.

DETAILED DESCRIPTION

The following description and the drawings illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
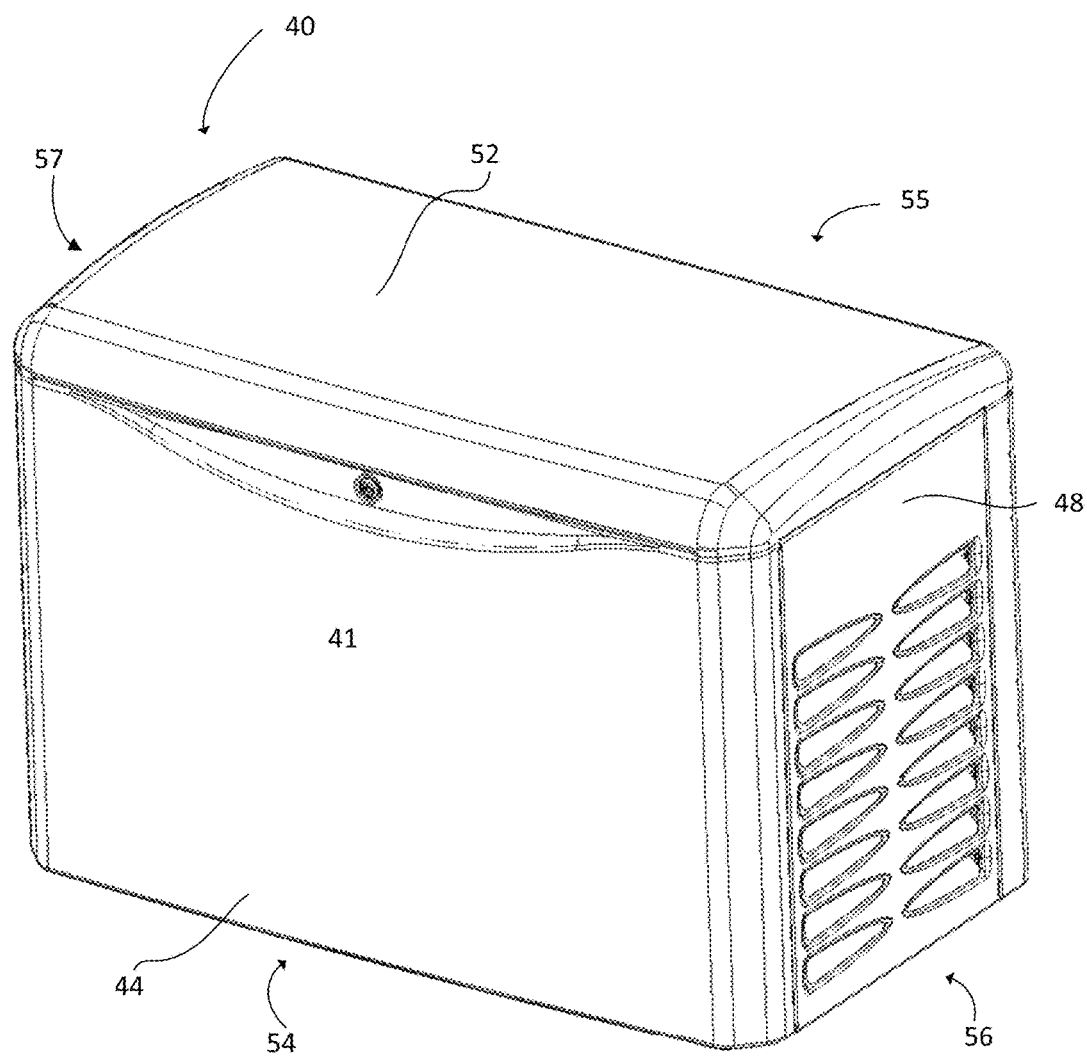
FIG. 1 illustrates an example generator enclosure system.

FIG. 1 illustrates a perspective view of the panels of an example generator enclosure system 40. The generator enclosure system 40 generally includes a generator enclosure 41 and internal components. The generator enclosure 41 includes a front panel 44 located at a front side 54; a back panel 46 located on a back side 55; a first side panel 48 located at a first side 56; a second side panel 50 located at a second side 57; and top panel 52.

Figure 2:
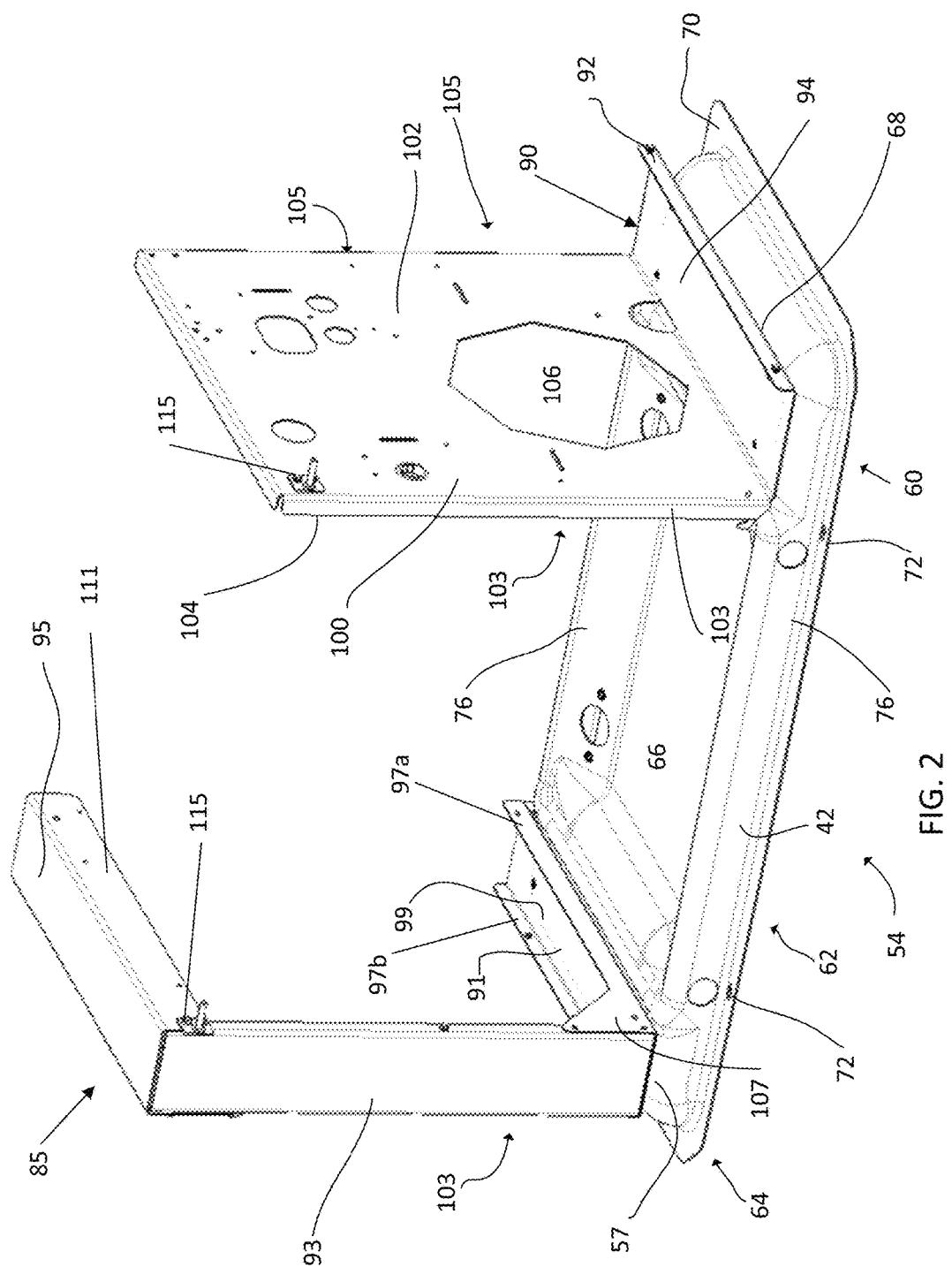
FIG. 2 illustrates a detailed view of the support structure of an embodiment of a generator enclosure system as depicted in FIG. 1.

FIG. 2 illustrates an internal perspective view of the generator enclosure system 40. The generator enclosure system 40 includes a base 42 to provide support for the generator enclosure system 40. The dimensions of the base 42 may be greater in an x-axis than a z-axis. The base 42 is divided into three sections, a first section 60, a middle (second) section 62, and a third section 64. The middle section 62 may be wider than the first section 60 and third section 64. For example, the middle section 62 may be twice to three times the width of the first section 60 and third section 64. The first section 60 and third section 64 include a substantially flat portion 68, where the substantially flat portion 68 is a planar, even surface. The flat portion 68 includes a surface for providing support for the structural elements of the generator enclosure system 40. The middle section 62 is formed by two rails 76 joining the first section 60 and third section 64. An opening 66 is formed within the middle section 62 by the two rails 76. The bottom portion of the base 42 may include a rim 70 that may extend around the circumference of the base 42 or some portion thereof. Posts 72 are mounted to the rim 70 adjacent to the middle section 62 of the base 42 at both the front side 54 and back side 55 of the base 42. Mounting holes may be located in the rim 70. Bolts may be inserted through the mounting holes to secure or fasten the base 42 to a foundation or another substrate.

The base 42 may be any size or shape. For example, the base may be 3 ft-6 ft in the x-axis and 2 ft-4 ft in the z-axis. Further, the footprint of the base may be in the shaped as a rectangle, L-shape, oval, or any other shape configured to support the generator enclosure system 40. The first section 60, middle section 62, and third section 64 may be formed as a single solid piece or each may be formed separately and joined together to form the base 42. The base 42 may be formed by a molding or casting. The base 42 may be made of any suitable material including but not limited to metal, plastic carbon fiber, fiberglass, or another material.

As depicted in FIG. 2, the first section 60 supports a bulkhead 100. The bulkhead 100 is formed in part as a flat panel 102 that includes a bend at the lower portion to form a U channel 90. The U channel portion includes a vertical element 92 offset adjacent to the flat panel 102. A bottom portion 94 is formed between the flat panel 102 and the vertical element 92. The bulkhead 100 includes a front side 103 located adjacent the front side 54 of the generator enclosure system 40. The bulkhead 100 also includes a back side 105 located adjacent the back side 55 of the generator enclosure system 40. Vertical edge 104 of the bulkhead 100 located at the front side 103 and back side 105 extend from the flat panel 102 at a 90-degree angle. The vertical edges 104 add rigidity to the panel and create fastening points. The bulkhead 100 extends substantially across the width of the base 42 from the front side 54 to the back side 55 of the generator enclosure system 40.

Referring to the bulkhead 100, the bottom portion 94 of the U-Channel 90 is connected to the first portion 60 of the base 42. The flat panel 102 and U-Channel 90 may be formed as separate pieces. Further, the flat panel 104 portion of the bulkhead 100 may also be connected directly to the base 42. The bulkhead 100 is in a vertical orientation, extending up from the base 42. The bulkhead 100 includes an opening 106 sized to allow sufficient airflow. Opening 106 allows for a pathway for air to flow from one side of the first bulkhead 100 to the other.

Also depicted in FIG. 2, is a frame 85 that works in connection with the bulkhead 100 to support the generator enclosure system 40. The base 42 as described above, supports the frame 85 of the generator enclosure system 40. The frame 85 may be generally configured as a U-channel configuration with a lower frame element 91, a vertical frame element 93, and an upper frame element 95.

The lower frame element 91 U-configuration may be configured with extensions 97a and 97b. Extension 97a is adjacent to the middle section 62 and extension 97b is adjacent the edge of the base 42. The two extension 97a, 97b may be connected by a web element 99. The web 99 includes openings 96 for mounting to the base 42. Extension 97a includes a reinforcement portion 107 located at the front side 54 of base 42. The reinforcement portion 107 maybe formed as a triangle-shaped plate that extends from extension 97a and is integrated thereto. The reinforcement portion 107 functions to support the connection between the lower frame element 91 and the vertical frame element 93. The lower frame element also includes a lip 101. The lip is a portion of the web element 99 bent 90 degrees to be in a vertical orientation. The lip 101 includes mounting holes for securing the back panel to the frame 85. The lower frame element 91 may be mounted on the flat portion 68 of the third portion 64 of the base 42.

The vertical frame element 95 is shaped similar to the lower frame element 91. The vertical frame element 95 U-configuration may be configured with extensions 97a and 97b. The two extension 97a, 97b may be connected by a web element 99. Extension 97a includes a reinforcement portion 107 located at the front side 54 of base 42. The reinforcement portion 107 maybe formed as a triangle-shaped plate that extends from extension 97a and is integrated thereto. The reinforcement portion 107 functions to support the connection between the lower frame element 91 and the vertical frame element 93. The upper portion of the vertical frame element 92 is attached to the upper frame element 95.

The upper frame element 95 includes a first element 111 and a second element 113. The first element 111 and second element 113 are connected by a web element 99 to form a U-channel. The first element 111 is located adjacent the middle section 62 of the base 42 and the second element 113 is located adjacent the edge of the base 42. The first and second elements 111, 113 extend downward from the web element 99 towards the base 42. The second element 113 extends down farther than the first element 111. The upper frame element 95 is substantially parallel with the lower frame element 91. The upper frame element 95 and lower frame element 91 are mounted to the vertical frame element 93 at approximately 90 degrees.

Figure 3:
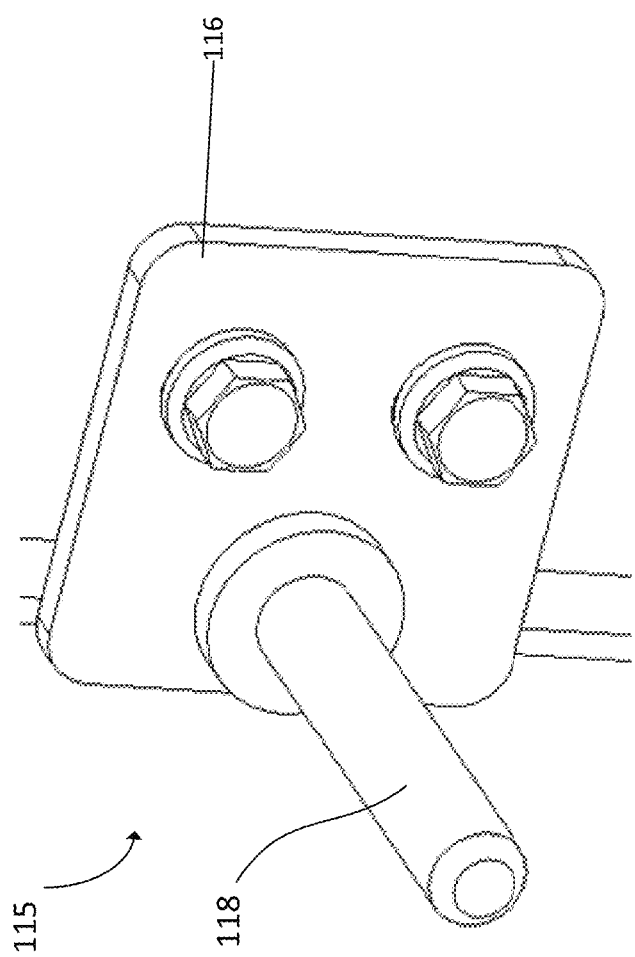
FIG. 3 illustrates a detailed view of a locking bolt as part of an example locking mechanism.

Depicted in FIGS. 2 and 3 are locking bolts 115. The locking bolts may be connected to each of the bulkhead 100 and the frame 85. Likewise, only one locking bolt 115 may be used and connected to either of the bulkhead 100 or fame 85. The locking bolt 115 includes a plate 116 and a bolt 118. The bolt 118 is affixed to the plate 116 at a right angle, extending out from the plate 116. The plate 116 includes openings for fasteners to extend through to attach the locking bolt 115 to the bulkhead 100 and fame 85. The locking bolt 115 may be mounted to the front side 103 of the bulkhead 100 or frame 85. The locking bolt 115 may also be mounted to the back side 105 of the bulkhead 100 or frame 85. The locking bolt 115 may be affixed to the bulkhead 100 and frame 85 at the top portion of the flat panel 102, with the locking bolt 115 extending out from the flat panel 102 of the bulkhead 100 and frame 85. The locking bolt 115 may alternatively be mounted in any position near the vertical edge 104 along the length of the front side 103 or back side 105 of the bulkhead 100 and frame 85. The locking bolt 115 may be mounted to either side of the flat panel 102.

The support elements: bulkhead 100 and frame 85 may be formed of metal, plastic, or other suitable materials. Support elements may vary in shape, configuration, and construction, as desired. The support elements are intended to provide support for elements of the generator enclosure system 40. Features and aspects of the disclosed support elements may vary considerably while accomplishing this objective.

Figure 4:
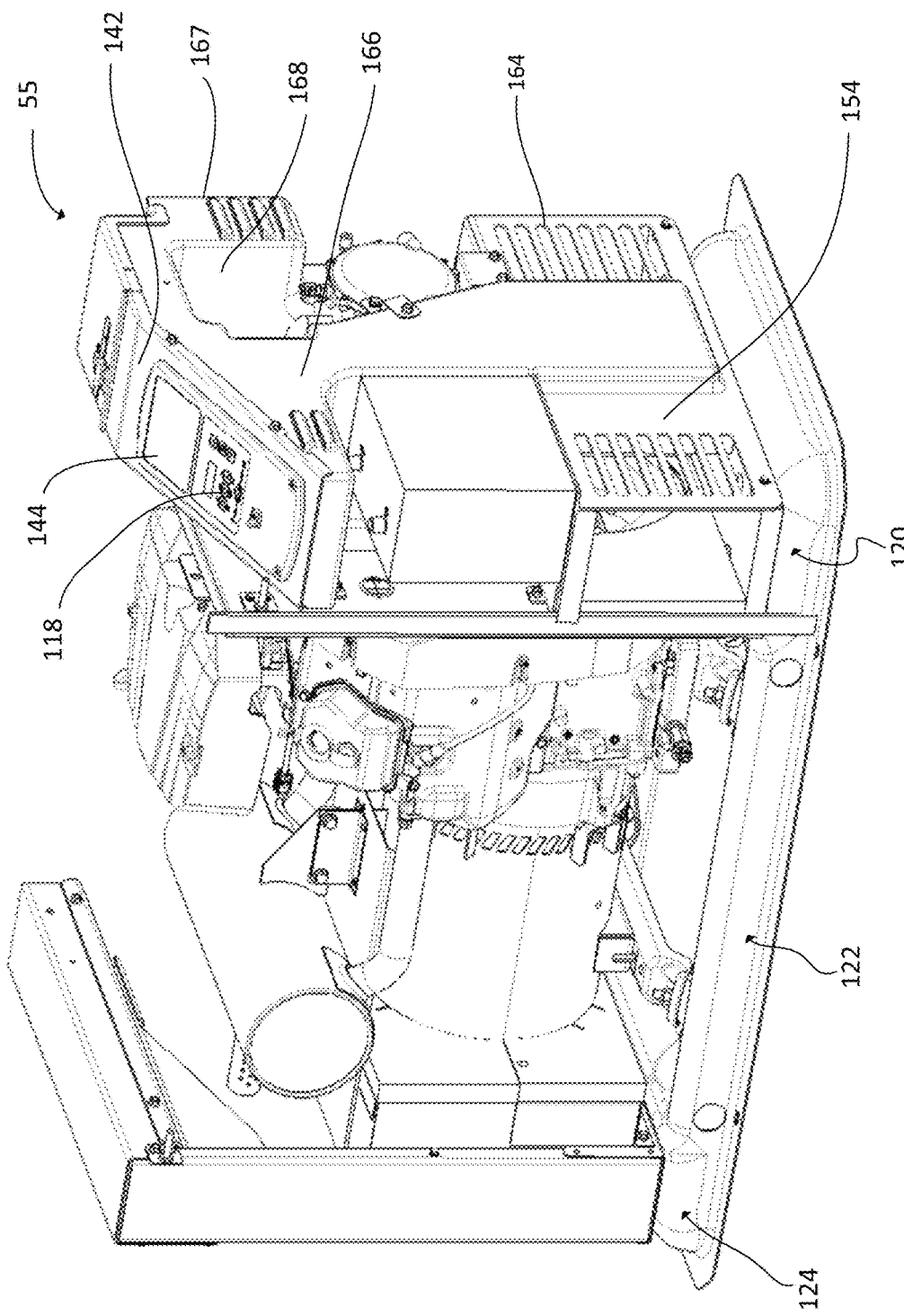
FIG. 4 illustrates a perspective view of the internal elements of the generator enclosure system as viewed from the front.

FIGS. 2 and 4 depict the bulkhead 100 and the frame 85, along with the base 42, dividing the generator enclosure system 40 into three chambers. A first chamber 120 being defined as the area above the first portion 60 and between the bulkhead 100 and the first side 56 of the base 42. A second chamber 122 is defined as the area above the middle section 62 between the bulkhead 100 and the frame 85. A third chamber 124 is defined by the area above the third section, which is encompassed by the frame 85. Each of the first chamber 120, second chamber 122, and third chamber 124 relate to specific functions of the generator enclosure system 40.

FIG. 4 illustrates the first chamber 120 including a control or electrical housing 142. The control housing 142 attaches to the first bulkhead 100. The control housing 142 includes a display 144 and key pad 146. The control housing 142 may also include a controller including a processor, breaker, field installation connections, relays, grounding lugs, and memory. The controller may control the operation of a generator control system.

The control housing 142 is attached to an electronic cooling system 166. The electronic cooling system 166 may be part of the control housing 142. The electrical cooling system 166 comprises an intake duct 168, a first channeling 171, a second channeling 172, and a transfer duct 170. The cooling system 166 may be a one-piece duct that creates a duct system from an input of fresh air at an intake 167 to exhaust the air at an intake housing 154. The intake 167 for the electrical cooling system 166 is on the back side 55 of the generator enclosure system 40. At the intake 167, is an intake duct 168. The intake duct 168 includes a four-sided section that attaches to the control housing 142 at one point. An open side of the intake duct mates with the bulkhead 100.

Figure 5:
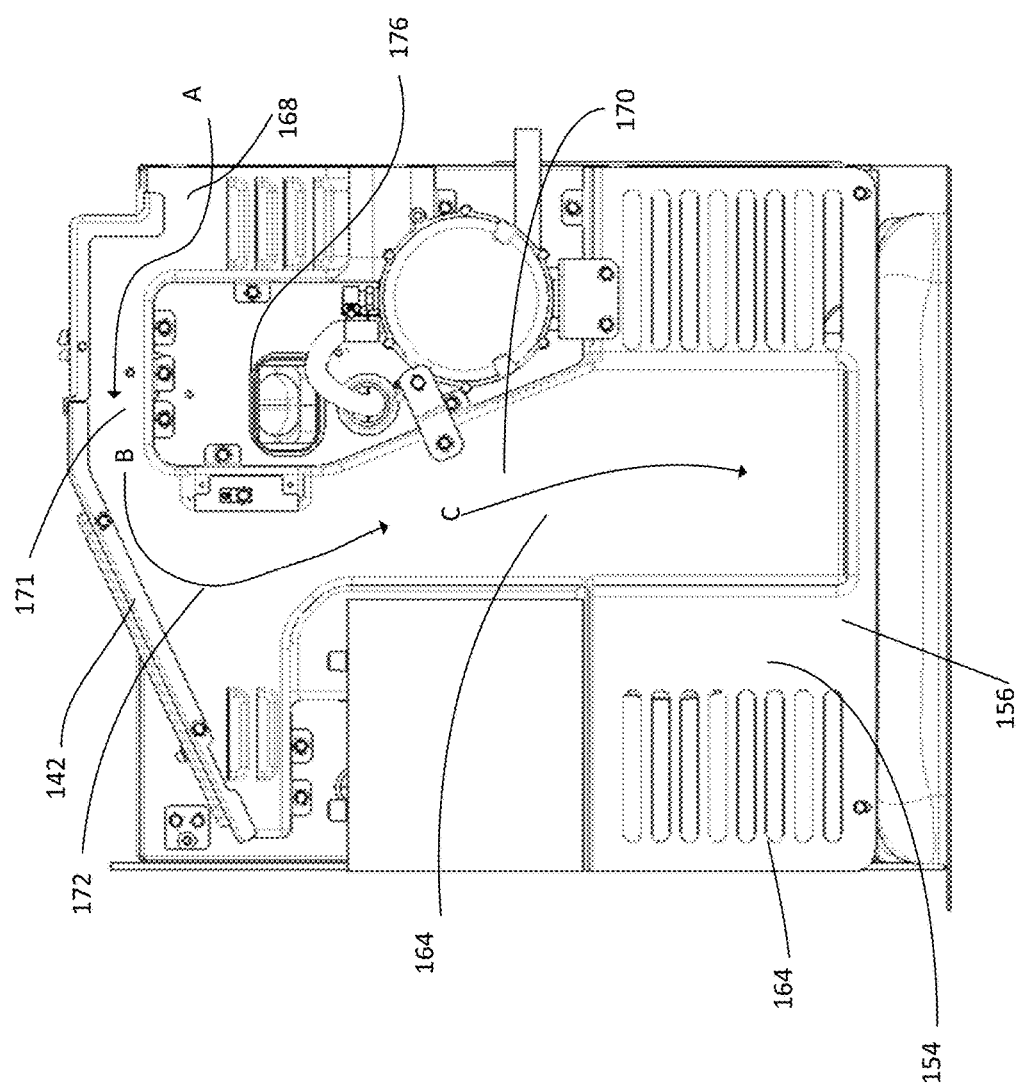
FIG. 5 illustrates a detailed internal view of the first side of a control housing and ventilation system of the generator enclosure system as depicted in FIG. 4.

As depicted in FIG. 5, the top of the intake duct 168 is open to the control housing 142. Air flows into the intake duct 168 through the intake 167 to enter the cooling system 166. The intake duct 168 is in fluid communication with the control housing.

Air is pulled through the intake duct 168 and directed up to the control housing 142 through a first channeling 171 along path A. The first channeling 171 is attached to the intake duct 168 at an end of the intake duct 168. The first channeling 171 is spaced from the control housing 142 to create a gap between the first channeling 171 and the control housing 142. The first channeling 171 may include a shaped element with two vertical members connected by a horizontal member. The first channeling 171 may form the bottom of the control housing 142. The first channeling 171 may then be connected to a second channeling 172.

The second channeling 172 is in fluid communication with the first channeling 171. The second channeling 172 services the keypad 144, display 144, and associated electronics of the control system. The second channeling 172 is attached to a sidewall of the control housing 142 and to the bulkhead 100. In this embodiment, the control housing 142 is orientated at downward angle as the control housing 142 extends towards the front panel 44. The second channeling 172 is shaped to conform to the angled orientation of the control housing 142 to remain connected with the side wall of the control housing 142. The second channeling 172 forms a path for air flow along a path B. As air flows through the second channeling 172 it enters a transfer duct 170 of the electrical cooling system 166.

As depicted in FIG. 5, the transfer duct 170 is may be a generally vertical duct. The transfer duct 170 connects the electronic ventilation system of the control housing 142 with an intake housing 154. The transfer duct 170 is generally located in the middle of the control housing 142. The bottom of the transfer duct 170 may be wider than the top. Air flows town the transfer duct 170 to the intaking housing 154 along path C.

Depicted in FIG. 5, the intake housing 154 includes a front vertical panel 156. The vertical panel 156 may be attached to the U-channel 90 of the bulkhead 100. The intake housing 154 is open at the front side 54 and back side 55. The intake housing 154 also includes a top panel 160. The top panel 160 may be formed from the vertical panel 156 and bent at a 90-degree angle. The connection of the vertical panel 156 and top panel 160 against the bulkhead 100 form an enclosed structure. Slots 164 formed in the vertical panel 156 allow for air to enter the intake housing 154.

Figure 6:
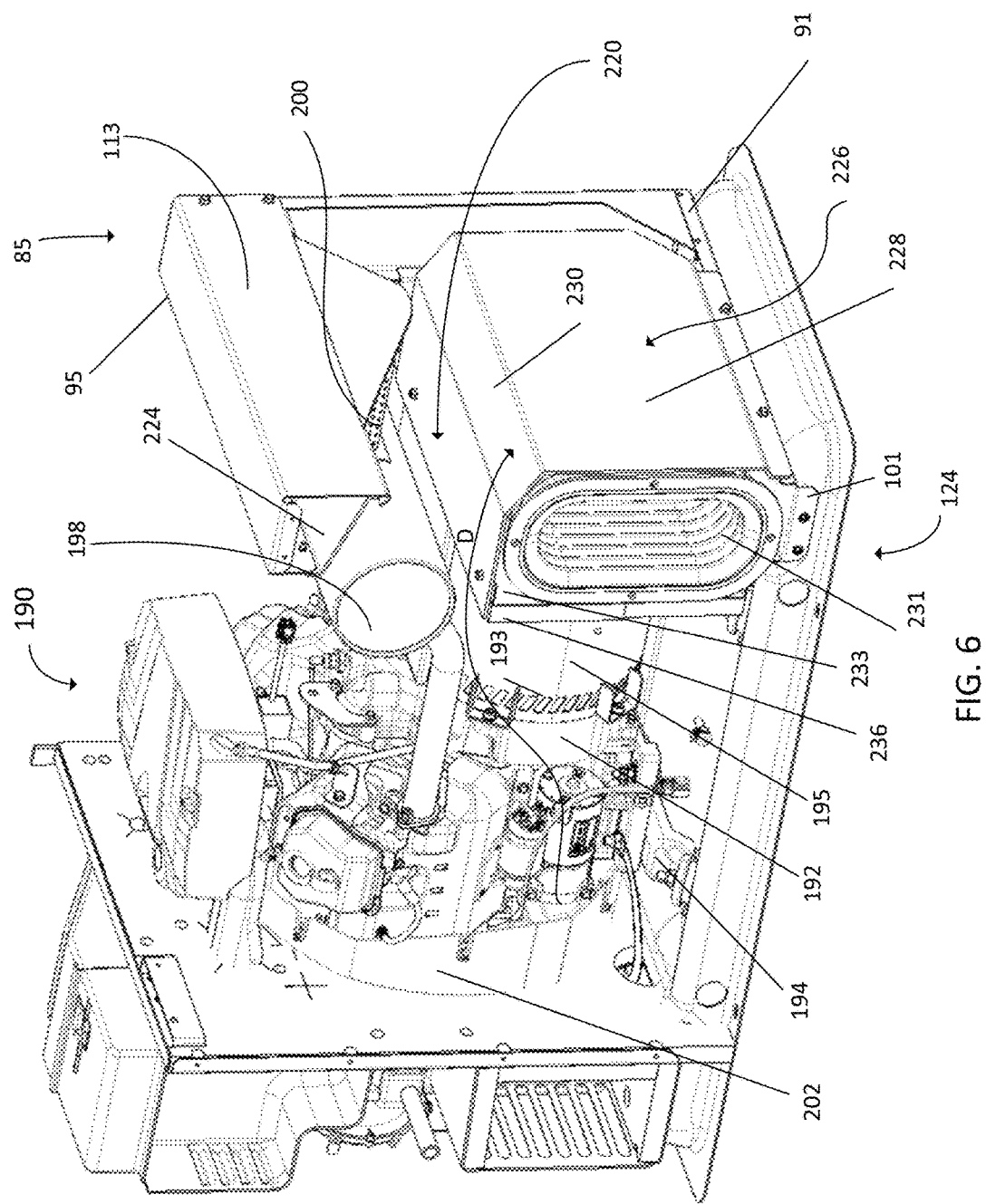
FIG. 6 illustrates a perspective view of internal components of the generator enclosure system as depicted in FIG. 4.

As depicted in FIG. 6 the second chamber 122 includes an engine 190 and alternator 192. The engine 190 includes motor mounts 194 to secure the engine 190 to the middle portion 62 of the base 42. The engine 190 may be an internal combustion engine 190. The engine 190 may include external components such as crankshaft, flywheel, muffler 198, air cleaning system, and a control portion. The engine 190 may be a two-stroke engine or a four-stroke engine. The number of cylinders of the engine 190 may vary to include one cylinder or multiple cylinders. The size of the engine may vary depending on the application.

The engine 190 may be any type of engine in which the combustion of a fuel (e.g., gasoline or another liquid fuel) with an oxidizer (e.g., air) in a chamber applies a force to a drive component (e.g., piston, turbine, or another component) of the engine. The drive component rotates to turn a drive shaft. As depicted in FIG. 5, combustion air for the engine 190 is brought in through the combustion air inlet 176 in the first chamber 120.

The engine 190 includes a fan connected to the drive shaft. The fan is contained within a housing 202 The housing 202, on one side mounts to the engine 190 and on the other connects to the bulkhead 100. The housing 202 aligns with the opening 106 within the first bulkhead 100. The fan operates to draw air into the second chamber 122 of the generator enclosure system 40. The air is drawn into the intake housing 154 in the first chamber 120 through the opening in the bulkhead 106 and into the second chamber 122. The air is then moved out of the second chamber 122 into the third chamber 124 and finally out of the generator enclosure system 40.

The drive shaft of the engine 190 may also be connected to an alternator 192. An alternator housing 195 encompasses the alternator 192. The alternator housing 195 connects to the engine 190 on one end. On the other end the alternator housing 195 connects to the frame 85 around the opening 108. The alternator 192 is operated by rotation of the drive shaft to turn the alternator 192 and produce electric output. A fan in contained within the alternator housing 195. The may be an in-line fan that is connected and spins with the alternator 192 pulling air through the alternator housing 195 and directing the air out vents 193.

As depicted in FIG. 6, the muffler 198 is connected to the engine 190. The muffler 198 serves to reduce the sound created by the engine 190 within the generator enclosure system 40. An exhaust pipe 200 is located on the muffler 198 as an output for the flow of the engine 190 exhaust gas. The exhaust pipe 200 extends out of the muffler 198 in the second chamber 122 and into the third chamber 124 to exhaust the engine 190 fumes from the second chamber 122.

FIG. 6 depicts the third chamber 124 of the generator enclosure system 40. The third chamber 124 is encompassed by the frame 85. The upper frame element 95 includes an upper deflector 224. The upper deflector 224 is connected to the first element 111 and second element 113. The upper deflector 224 extends down at an angle from the first element 111 to the second element 113. The upper deflector 224 may extend down at an angle in the range of 30 to 60 degrees.

A lower deflector 226 is attached to the lower frame element 91. The lower deflector 226 includes a first portion 228 that attaches to the extension 97b of the lower frame element 91. The first portion 228 extends vertically up from the vertical frame element 91. The lower deflector includes a second portion 230 that is connected to the first portion 228. The second portion 230 connects to the first portion 228 at an angle. The second portion 230 extends up at an angle in the range of 30 to 60 degrees. A third portion 234 extends horizontally from the second portion 230. Lastly, a forth portion 236 extend downward from the third portion 234 at a 90-degree angle down to the lower frame element 91. The lower deflector 226 connecting to the lower frame element 91 forms an internal channel 233.

The area between the upper deflector 224 and the lower deflector 226 forms a cooling exhaust channel 220. The exhaust channel 220 functions to deflect the exhaust gas down and out of the third chamber 124.

As depicted in FIG. 6, the internal channel 233 houses an alternator cooling duct 231. The alternator cooling duct 231 is connected to and in fluid communication with the alternator housing 195 on one end. The alternator cooling duct 231 is shaped to fit within the fame 85 of the third chamber 126. As depicted it is oval shaped. It may, however, be of any cross-sectional shape to facilitate air flow. The alternator cooling duct is attached to the back panel 47 on the other end. Air is pulled from the outside by the alternator fan through the alternator cooling duct 231 and into the alternator housing 195.

Figure 7:
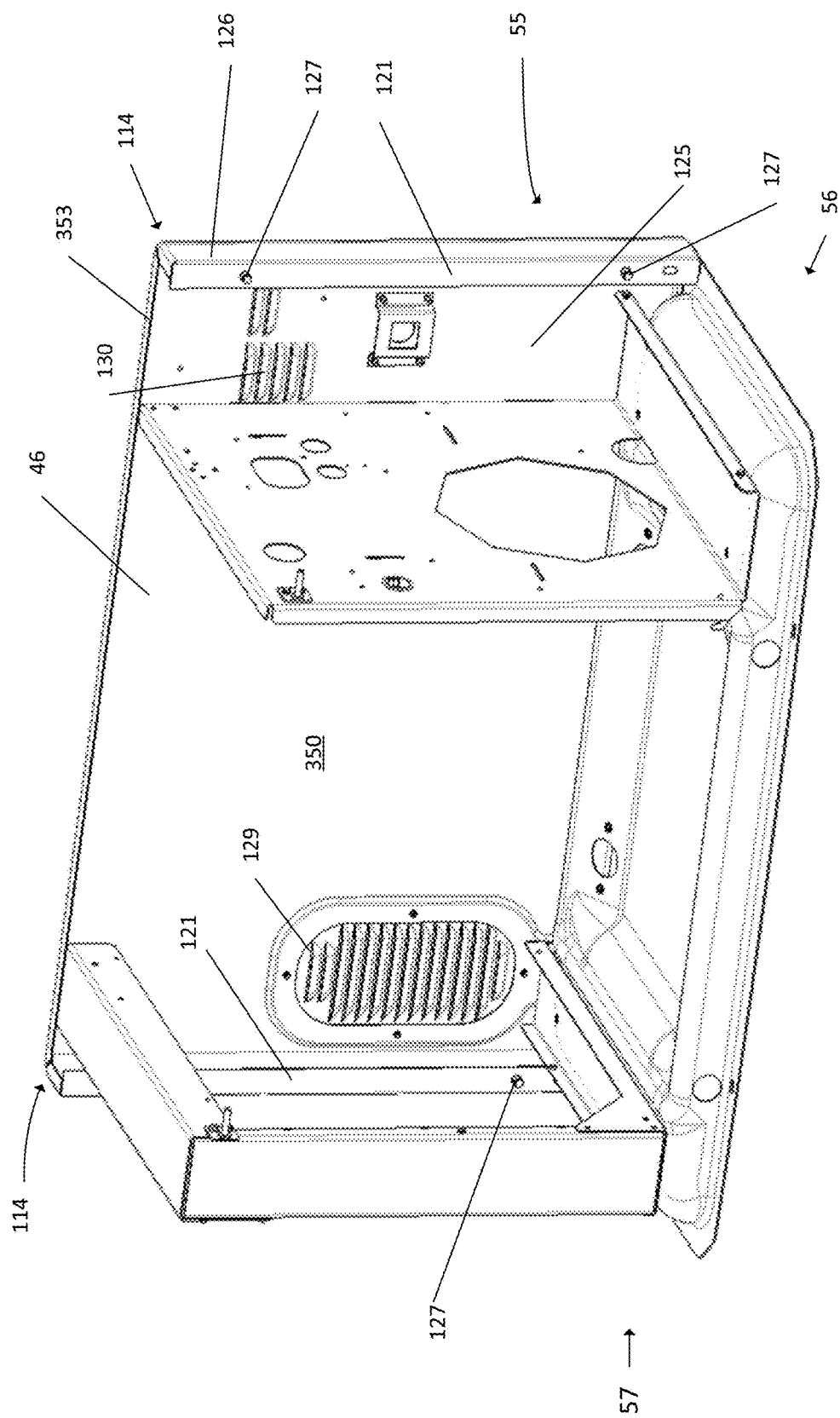
FIG. 7 illustrates a perspective view of the support structure of the generator enclosure system of FIG. 1, including a rear panel.

As depicted in FIG. 7, the back panel 46 makes up a portion of the generator enclosure system 40. The back panel 46 includes a flat portion 350 and corner elements 114. The back panel 46 extends the width of the back side 55. The back panel 46 extends vertically from the base 42 to the top panel 52. The bottom of the back panel 46 may include a reinforcing edge 352. The reinforcing edge acts as the bottom of the back panel 46. The bottom reinforcing edge is configured to rest upon the base 42. The back panel 46 also includes a top reinforcing edge. The top reinforcing edge is formed as a 90-degree bend from the back panel 46. The back panel 46 connects to the back side 55 of the generator enclosure system 40 via bolts to the bulkhead 100 and frame 85 at holes 354.

The corner elements 114 of the back panel 46 include a back portion 125 and a side portion 126. The back portion 125 and side portion 126 meet at substantially 90-degrees. The back portion 125 being along the back 55 of the base 42 and a side portion 126 along the first side 56 and second side 57 of the base. The outside corner of the corner elements 114 can have a rounded or curved corner. An end surface 121 is formed at the distal end of the side portion 126. The end surface 121 is perpendicular to the side portion 126 surface.

The corner element 114, in connection with the first chamber 120, may include a louver 130 on the upper end of the corner element 114. This louver 130 is an opening on the back portion 125. The louver 130 creates a passage from the outside to within the electrical cooling system 166 for air flow to the control housing 142.

The corner element 114, in connection with the third chamber 124, may include an alternator cooling inlet 129 on the lower end of the corner element 114. The alternator cooling inlet 129 includes an opening in the back portion 125 of the corner element 114, creating a passage for air to travel from the outside of the generator enclosure system 40 to inside the third chamber 124.

In the assembled state, one of the corner elements 114 of the back panel 46 is attached to the first bulkhead 100 along the back side 55 along the vertical edge.

The other corner element 114 is attached to the frame 85 along the back side 55 at the lip 101 of the lower frame element 91 and upper frame element 95. The back portion 125 of the corner elements 114 form a part of the back side 55. The back portion 125 of the corner elements 114 may about the back panel 46 and create a planar surface of the back side 55 of the generator enclosure system 40.

Figure 8:
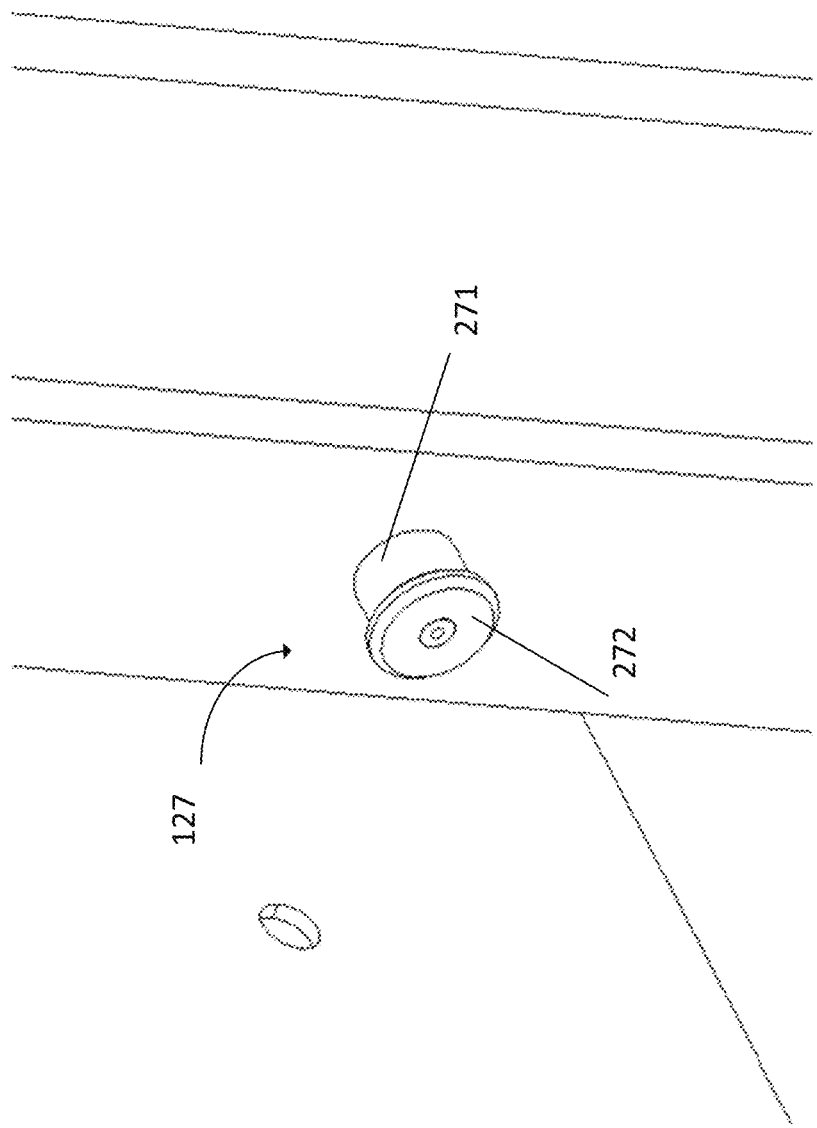
FIG. 8 illustrates the perspective view of a mounting post of the generator enclosure system of FIG. 1.

As depicted in FIGS. 7 and 8, the corner elements 114 include multiple mounting posts 127. The mounting posts being further depicted in FIG. 8. The corner elements 114 may include two mounting posts 127. The mounting posts 127 may include a shank 271. The shank 271 has a head 272 is attached to an end of the shank 271 The shank 271 may be an elongated cylinder or cone shaped, with the widest diameter near the head 272 and tapering towards the corner element 114. The head may be shaped as a flat cylinder. The end opposite the shank 271 is attached to the end surface 121 of the corner element 114. The shank 271 may extend perpendicular to the end surface 121 of the side portions 126. The head 272 may be parallel to the end surface 121.

Figure 9:
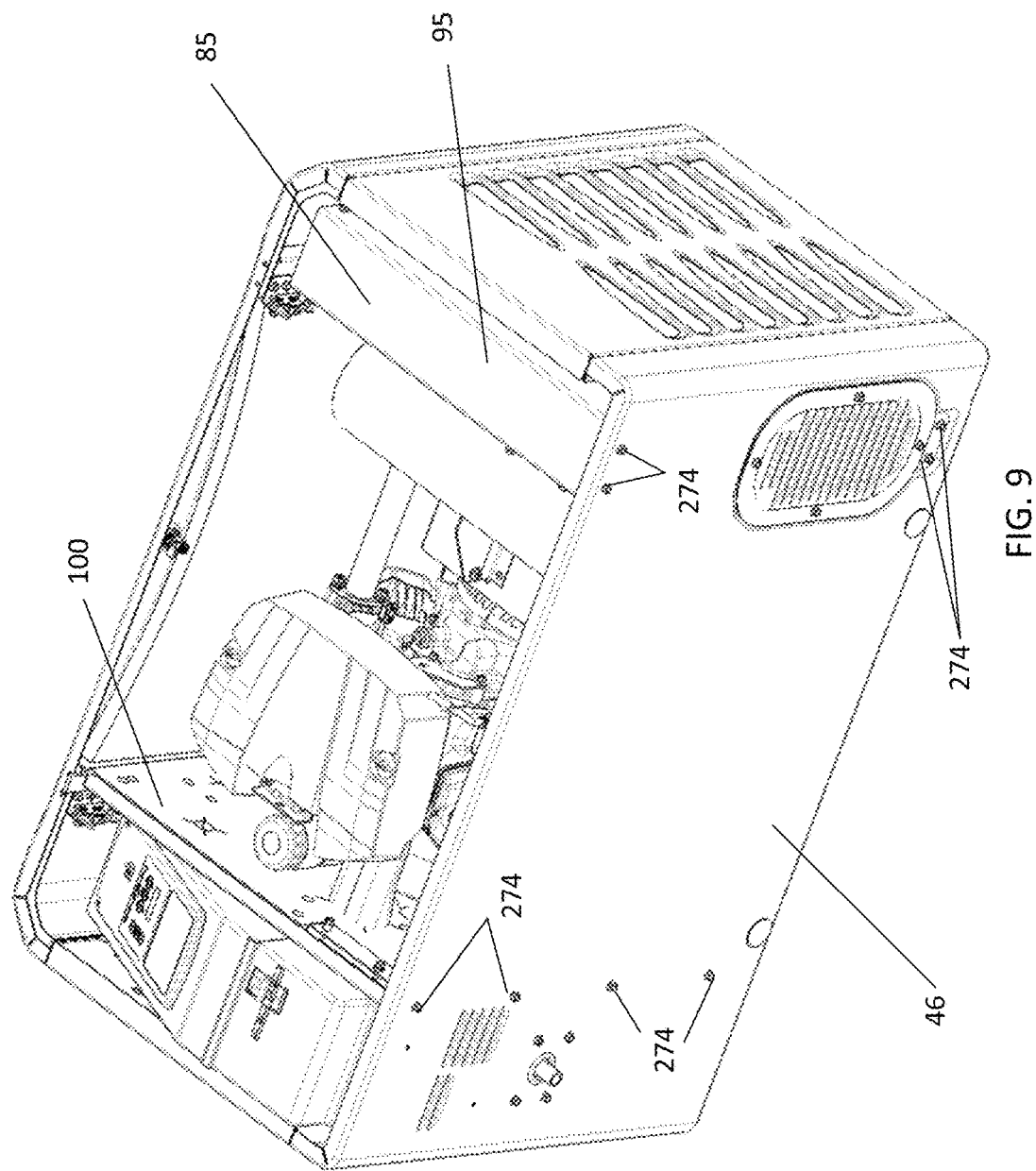
FIG. 9 illustrates a perspective view of the back side of the generator enclosure system of FIG. 1.

FIG. 9 depicts the back panel 46 installed along with the front panel and side panels. As depicted in FIG. 9, the back panel 46 is attached to the bulkhead 100 and frame 95 with bolts 274. Bolts 274 are orientated vertically along the bulkhead 100. Bolts 274 are also found attached to the frame 85 at the lip 101 of upper frame element 95 and the lip 101 of the lower frame element 91. It is also contemplated that the back panel 46 may be configured just as the front panel 44 described above utilizing the locking mechanism 288. Further, it is contemplated that the back panel 46 may be connected to the bulkhead 100 and frame 85 in the same manner as the front panel 44.

Figure 10:
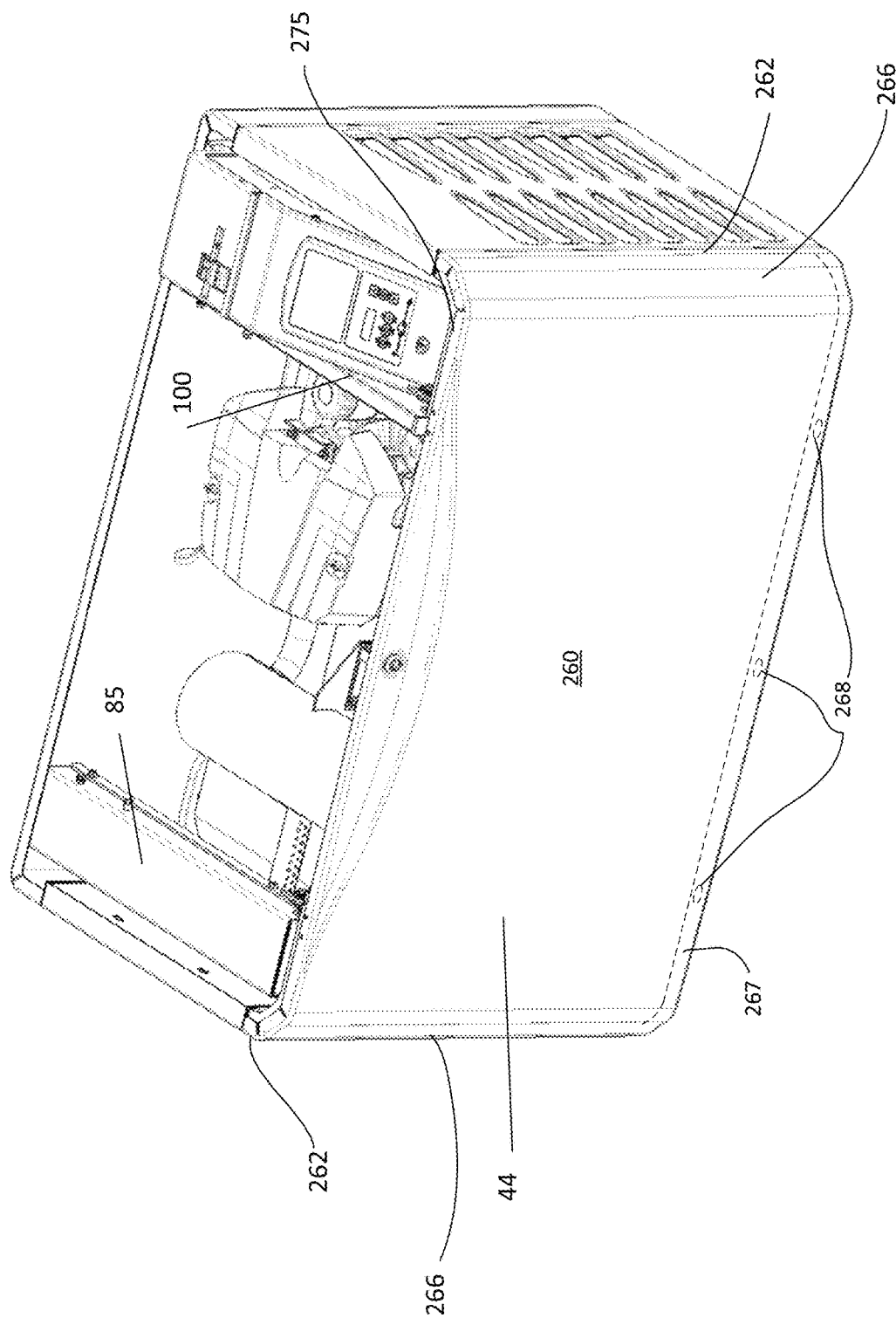
FIG. 10 illustrates an internal perspective of the front side of the generator enclosure system of FIG. 1.

FIG. 10 illustrates the front panel 44 of the generator enclosure system 40. The front panel 44 spans the width of the base 42 to encompass and cover the base 42. The front panel 44 extends from the base 42 to above the bulkhead 100 and frame 85. The front panel 44 includes a flat panel portion 260. The flat portion 260 joins side extensions 262 that are disposed at a distal end of the flat portion 260 at right angles. As depicted in FIG. 10, the distal side edges of the flat portion 260 is joined to the side extensions 262 by an edge bend 266. It is contemplated that the edge bend 266 may be square, chamfered or of any other configuration. An end surface 269 is formed at the distal end of the side extensions 262. The end surface 269 is perpendicular to the side extensions 262.

FIG. 9 also illustrates the inside bottom of the front panel 44 as a dashed line. The bottom of the front panel 44 may include a bottom rim 267. The bottom rim 267 is formed to the front panel 260 at a right angle. The bottom rim 267 acts as the bottom of the front panel 44. The bottom rim 267 is configured to rest upon the base 42. Formed within the bottom rim 267 are multiple apertures 268. The apertures 268 may be elongated holes. The apertures 268 are sized to fit the posts 72 of the base 42. In the installed state, the posts 72 of the base 42 are inserted into the apertures 268 of the front panel 44. It is contemplated there will be at least the same number of apertures 268 in the bottom rim 267 as there are posts 72 of the base 42. The front panel 44 may also include a top rim 275 of the front panel 44. The top rim 275 is formed to the flat panel 260 at a right angle, just as the bottom rim 267.

Figure 11:
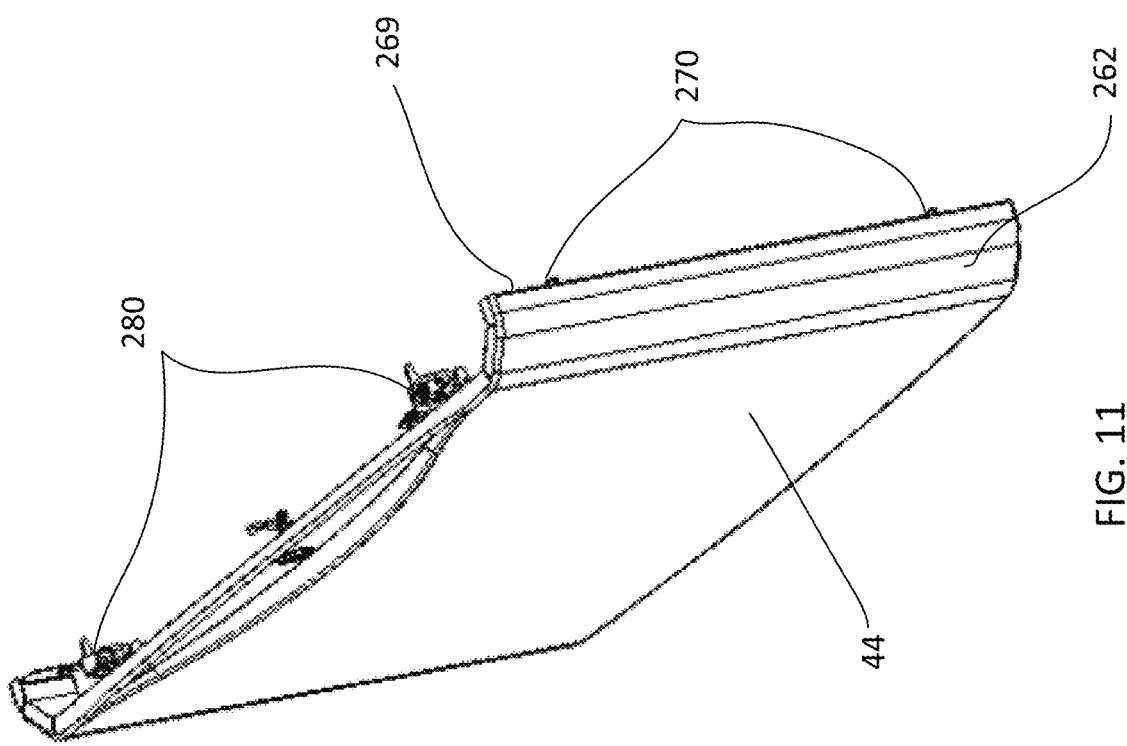
FIG. 11 illustrates a perspective of the front panel of the generator enclosure system of FIG. 1.

FIG. 11 further illustrates the side extensions 262. The side extensions 262 may include connecting elements, mounting posts 270 affixed to the end surface 269 of the side extension 262. The mounting posts 270 of the front panel 44 may be of the same configuration as the mounting posts 127 for the corner elements 114 as described above and depicted in FIG. 8. The front panel 44 may include two mounting posts 270 on each side extension 262. The mounting posts 270 may include a shank 271 and a head 272 attached to the shank 271. The shank 271 may be elongated cylinder or cone shaped, with the widest diameter near the head 272 and tapering towards the side extension 262. The head 272 may be shaped as a flat cylinder. The end of the shank 271 opposite the head 272 is attached to the end surface 269 of the front panel 44. The shank 271 may extend perpendicular to the end surface 269 of the side extension 262. The head 272 may be parallel to the end surface 269.

Figure 12:
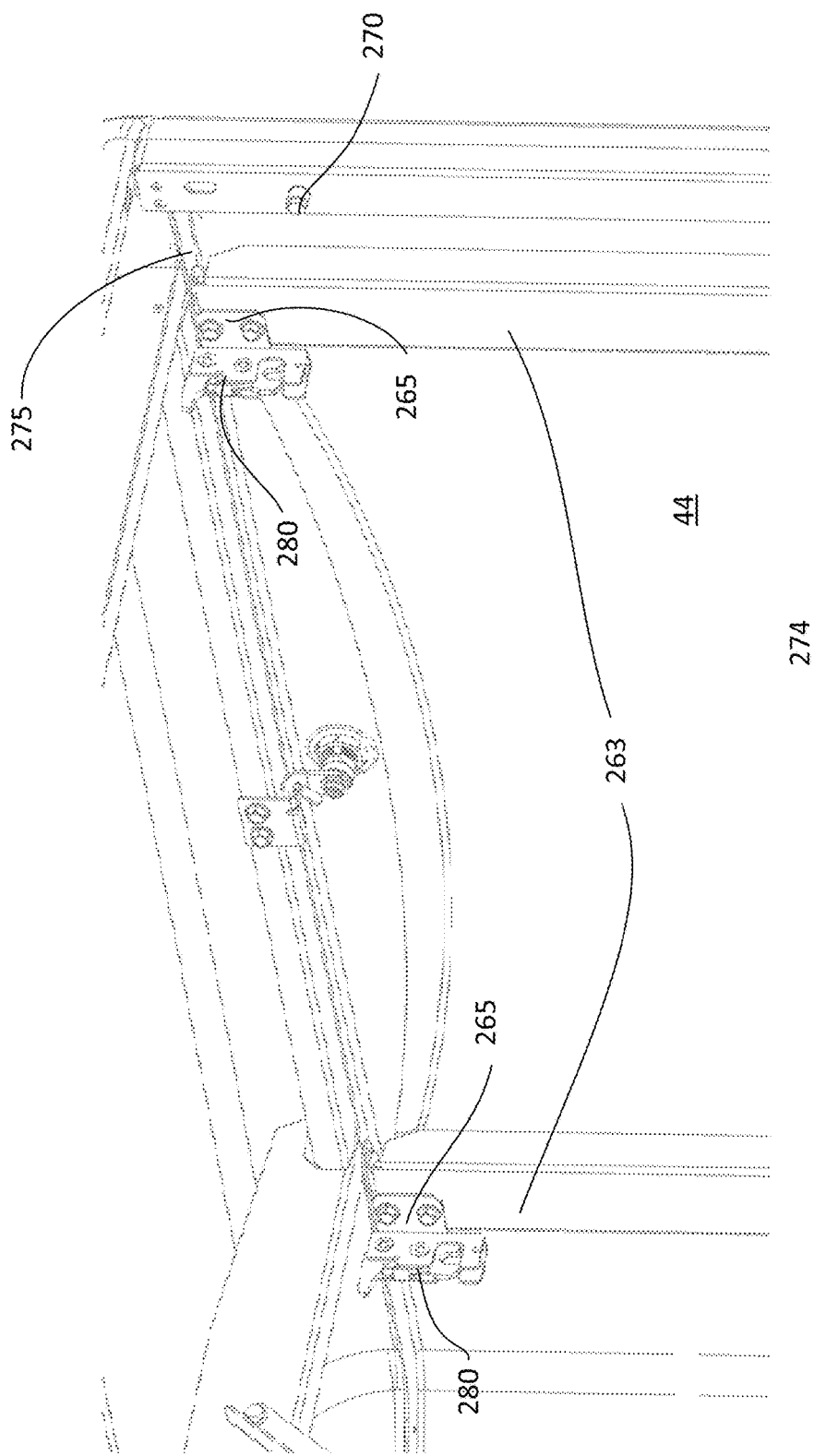
FIG. 12 illustrates a perspective of an internal portion of the front panel of the generator enclosure system of FIG. 1.

FIG. 12 illustrates the internal structure of the front panel 44. The internal structure includes two vertical supports 263. One vertical support 263 is mounted on one end of the front panel 44, and the second is mounted on the opposite end of the front panel 44. The vertical supports 263 extend from just above the bottom of the front panel 44 to just below the top. The vertical supports 263 are attached to the front panel 44 at connection points at the top rim 275 and the bottom rim 267 of the front panel 44. The vertical supports 263 add structure to the front panel 44.

The vertical elements 263 maybe separate from the front panel 44 or integral with the front panel 44. The vertical elements 263 maybe made of any suitable metal or other material of sufficient strength.

Depicted in FIG. 12 is an angle mount 265. The angle mount 265 may be attached to each of the vertical supports 263 of the front panel 44. It is contemplated that only one angle mount 265 is connected to one vertical support 263 for attachment of the locking mechanism 288. The angle mount 265 may be a L-shaped. A first portion of the angle mount 265 is fastened to the vertical support 263 in a parallel orientation. The second portion extends from the vertical support 263 and front panel 44 at a right angle. The angle mount 265 may include multiple apertures for placing a bolt through to fasten to the vertical support 263. A bolt extends through each of the apertures of the angle mount 265 to fasten the angle mount 265 to the vertical member 263.

Figure 13:
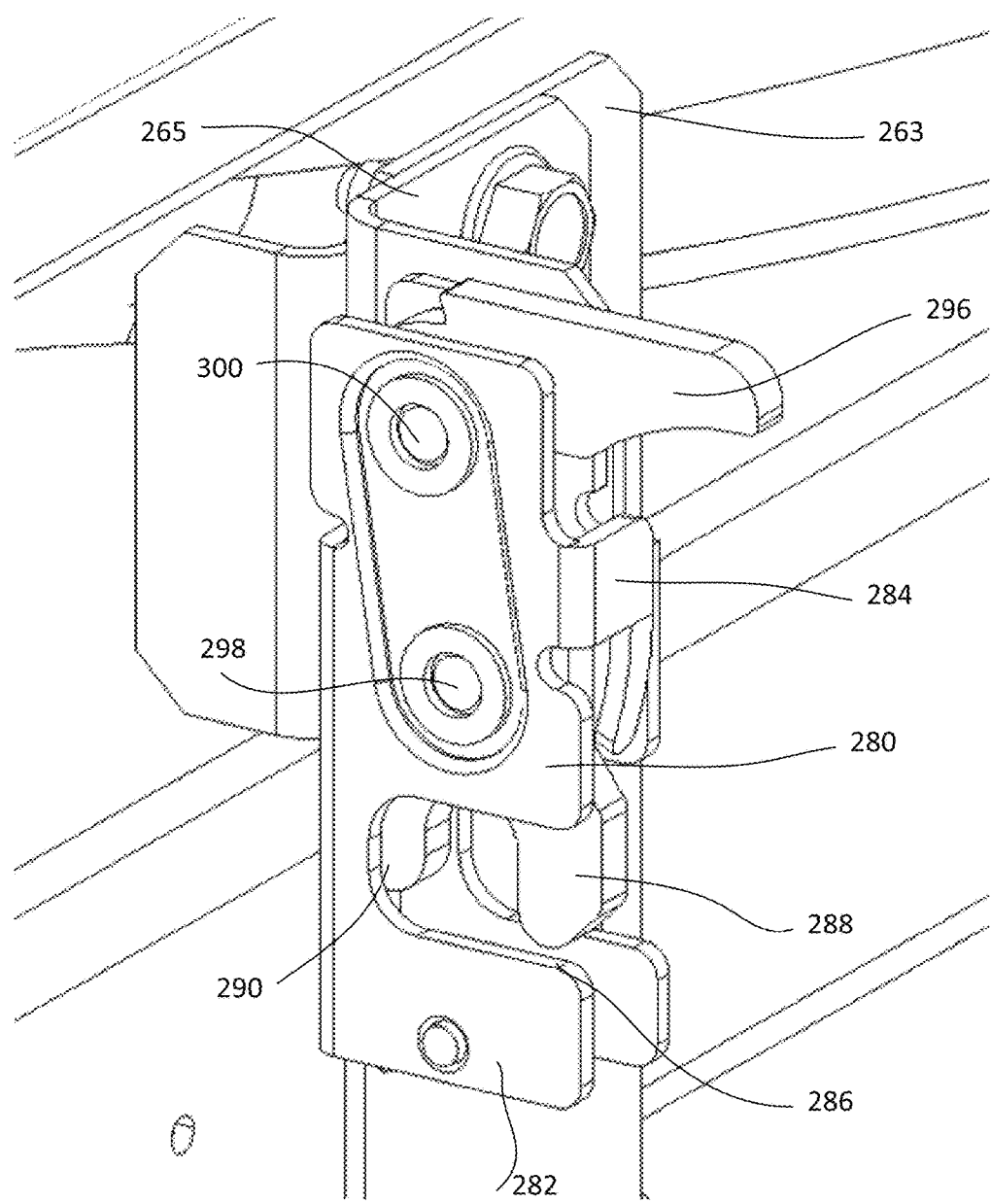
FIG. 13 illustrates an example locking mechanism of the generator enclosure system of FIG. 1.

As illustrated in FIGS. 12 and 13, the front panel 44 may include one or more locking mechanisms 280. One locking mechanism 280 may be mounted to each end of the internal side of the front panel 44 at the vertical supports 263. The locking mechanisms 280 attach to the vertical supports 263 via the angle mount 265. The locking mechanisms 280 mount to the second portion of the angle mount 265 and is orientated perpendicular to the front panel 44.

The locking mechanisms 280 include a deep U-channel configuration. Traversing a portion of the channel of the locking mechanism 280 is a stop 284. A retention element 288 is pivotably attached at a first pivot point 298 within the U-channel. The retention element 288 is a horseshoe configuration, configured to accept and retain the bolt 118 of the locking bolt 115. A slot 286 is formed in a lower portion of the locking mechanism 280. The retention element 288 is found in communication with the slot 286. In a locked position, as depicted in FIG. 10, the retention element 288 is contained within the U-channel of the locking mechanism 280, immediately adjacent the slot 286.

Part of the function of the locking mechanism 280 is a release, which includes a lever 296. The lever 296 is pivotably mounted to the locking mechanism 280. In the locked position, the lever 296 holds a cam lock in place, retaining the retention element 288 within the locking mechanism 280. When the lever 296 is pulled upwards, the cam lock is released and a spring-loaded function of the retention element 288 activates the retention element up and out of the locking mechanism 280.

Figure 14:
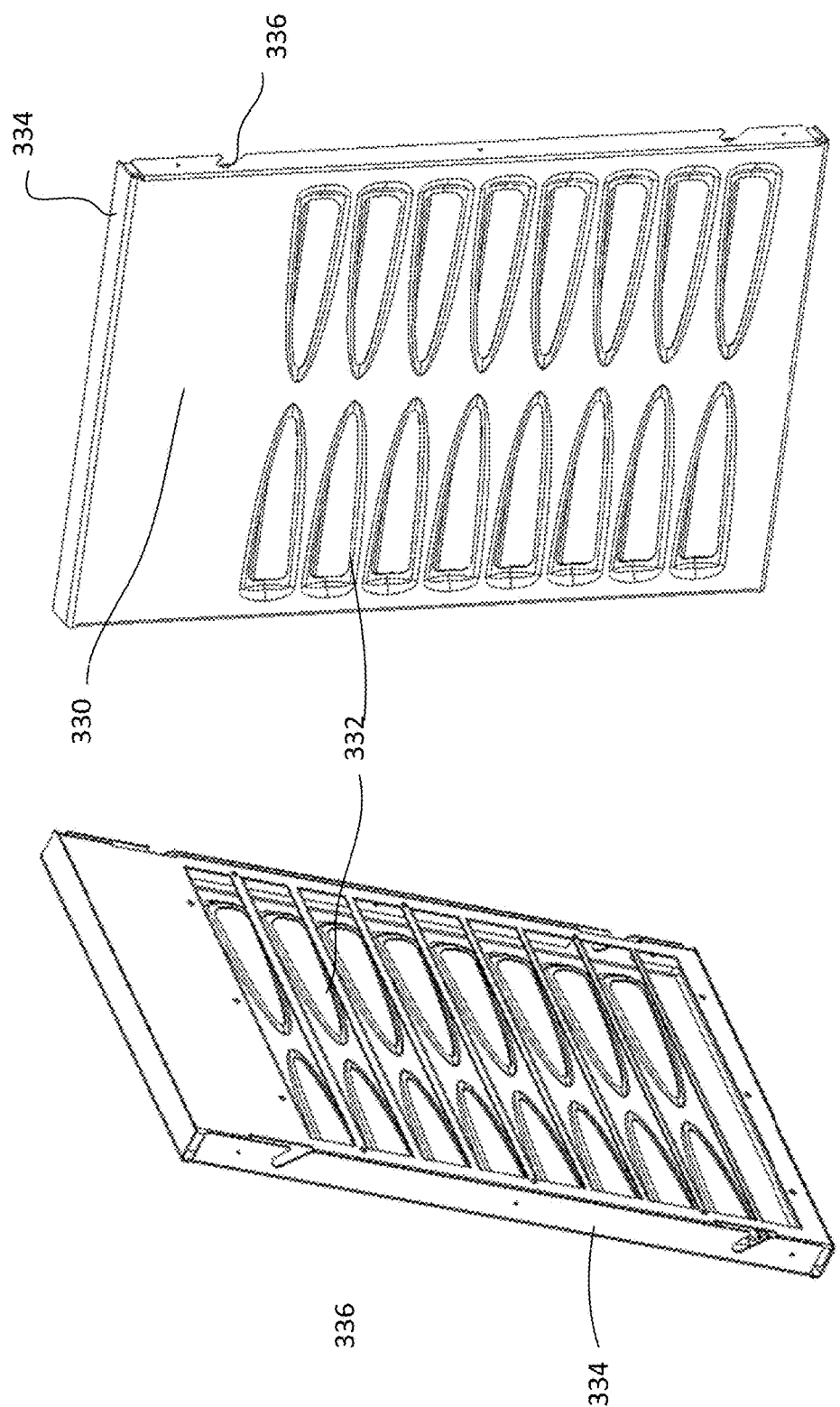
FIG. 14 illustrates an example side panel of the generator enclosure system of FIG. 1.

As depicted in FIG. 14 and referred to above, the generator enclosure system 40 includes the first side panel 48 for the first side 56 and second side panel 50 for the second side 57 of the generator enclosure system 40. Each of the first side panel 48 and second side panel 50 may have the same configuration and/or be interchangeable. The side panels 48, 50 include a flat portion 330. The side panels 48, 50 are sized to fit between the front panel 44 and corner post 114, as well as from the base 42 to the top panel.

On each edge of the flat portion 330 is an edge bend 334. The edge bend 334 is orientated at a right angle to the flat panel 330. The edge bend 334 adds rigidity to the side panels 48, 50. Within each vertical portion of the edge bend 334, are connector elements, known as mounting slots 336. The mounting slots 336 are grooves cut into the vertical portions of the edge bends 334. The mounting slots 336 are in an angled orientation, with the depth of the groove in the edge bend 334 increasing the deeper the groove extends into the edge bend 334. The mounting slots 336 are sized to accept the shank 271 of the mounting posts 127, 270. There may be two mounting slots 336 on each vertical portion of the edge bend 334 of each side panel 48, 50. Other connecting elements of the side panels 48, 50 are contemplated.

The flat portion 330 of the side panels 48, 50 include a plurality of louvers 332. The louvers 332 may be apertures within the flat portion 330. The louvers 332 function to allow air to flow from outside the generator enclosure system 40 to the inside. In the case of the first side panel 48, the louvers 332 allow air to flow from outside to inside the first chamber 120. Likewise, the louvers 332 in the second panel 50 allow air to flow from outside to inside the third chamber 124. As depicted in FIG. 11 louvers 332 are tapered elongated openings. The louvers 332, however, may be of any size, shape, or configuration to facilitate sufficient air flow through the panel.

Figure 15:
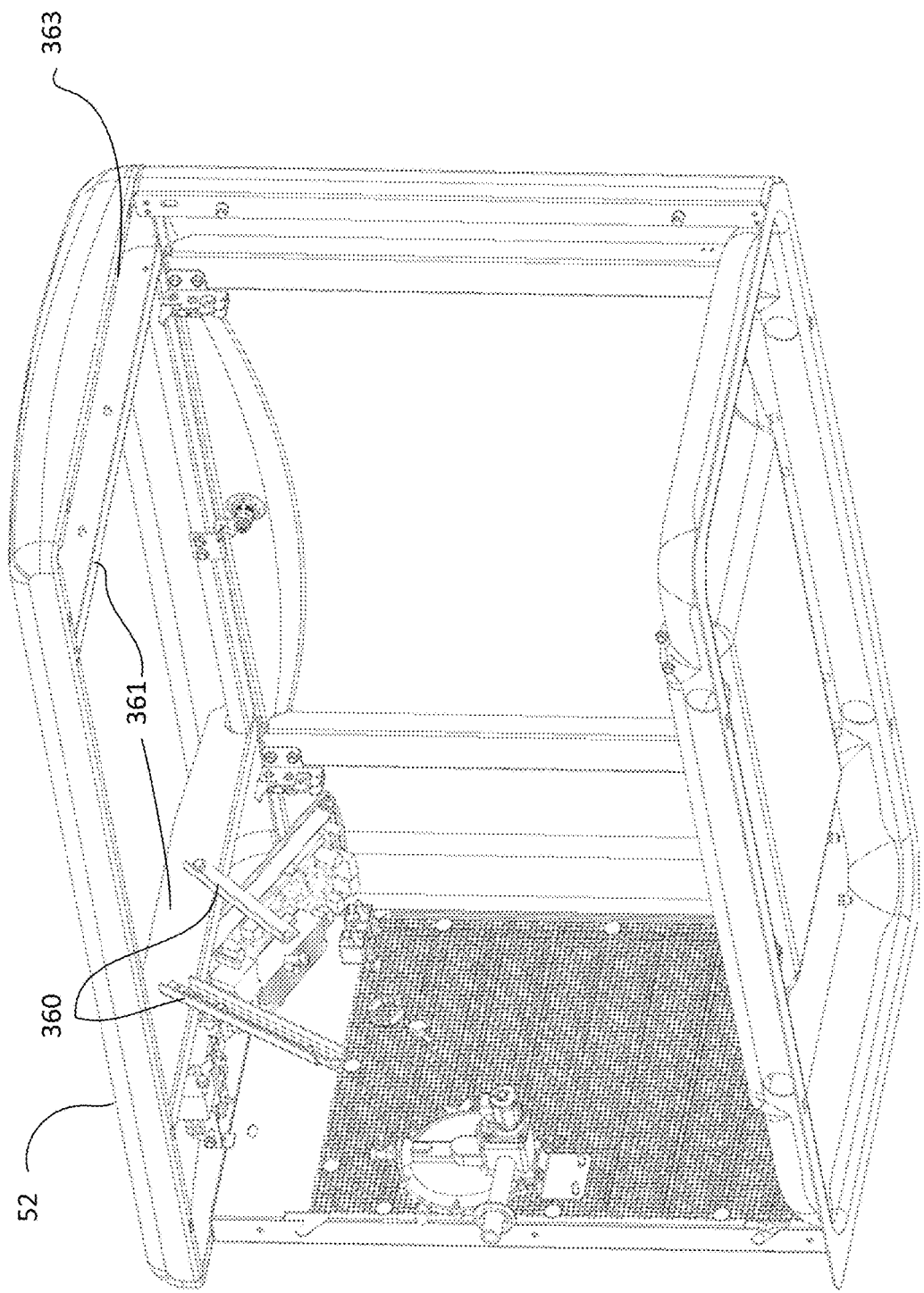
FIG. 15 illustrates an example interior perspective of an example hinge and top panel of the generator enclosure system of FIG. 1.

FIG. 15 depicts the generator enclosure system 40 including a top panel 52 or cover. The top panel 52 is configured to extend from the back panel 46 to the front panel 44, and from the first side panel 48 to the second side 50. The top panel 52 may be a dome-like configuration. The top panel 52 is sized to cover the top of the generator enclosure system 40 to protect the generator enclosure system 40 from weather elements. The top panel 52 includes a rim 363 that may extend around the circumference of the top panel 52. The top panel 52 includes panel supports 361 on the underside. The top panel supports 361 span the depth of the top panel 52 from the front side 54 to the back side 55.

Also, as depicted in FIG. 15, the top panel 52 includes a set of two hinges 360 (one set depicted). Each of the hinges 360 are mounted to the panel support 361 located on the underside of the top panel 52. The hinge 360 may be fastened to the first bulk head 100 or the frame 85. The hinges 360 operate, such that, as the top panel 52 is raised the hinges 360 move the top panel 52 up and in the direction of the back side 55. The backward movement of the hinges 360 is such that when the top panel 52 is in the fully opened position, the top panel 52 has sufficient clearance from the back panel 46 to be removed. The top panel 52 may be dome shaped or any other shape to facilitate covering the generator enclosure system 40.

The generator enclosure system 40 functions to allow for a tool-less disassembly and assembly of the front panel 44, first side panel 48 and second side panel 50. An individual or technician is able to remove and attach the front panel 44, first side panel 48, and second side panel 50 by hand and without the need or use of a tool or device. The generator enclosure system 40 enables quick removal of the essential elements of a generator enclosure to access internal components to perform service on the system.

In use, completely assembled, as depicted in FIG. 1, the front panel 44, first side panel 48, second side panel 50, back panel 46, and top panel 52 are connected to form a uniform generator enclosure 41 to encompass the generator enclosure system 40.

The back panel 46 is retained in position by the bolts 274 as described above. The front panel 44 is retained in position by the locking mechanisms 280 along with the posts 72 working together. The posts 72 reside within the apertures 268 of the front panel 44 to hold the bottom of the front panel 44 in place. The top of the front panel 44 is retained in place by the locking mechanisms 280. The bolt 118 of the locking bolt 115 is locked in place within the horseshoe configured portion of the retention element 288 within the U-channel of the locking mechanism 280. In this position, the front panel 44 is locked in place against the bulkhead 100 and frame 85.

In the installed state, the first side panel 48 is installed between the corner element 114 and side extension 262 on the front panel 44 on the first side 56 of the generator enclosure system 40. Likewise, the second side panel 50 is installed between the corner element 114 and the front panel 44 on the second side 57 of the generator enclosure system 40. As described above, the first side panel 48 and second side panel 50 attach to the generator enclosure system 40 in the same manner. The following description will apply to both the first side panel 48 and second side panel 50. The side panels 48, 50 are fixed to the front panel 44 and corner elements 114 through the mounting posts 127 on the front panel 44 and corner elements 114. The shank 271 of the mounting post 270 resides in the mounting slots of the first side panel 48. The head 272 of the mounting posts retains the edge bend of the first side panel 48. The head 272 is of a larger diameter than the distance across the mounting slot 336. The head 272 of the mounting post 127 connected to the front panel 44 maintains the vertical edge bend 334 of the first side panel 48 against the front panel 44. The head 272 of the mounting post 270 connected to the corner element 114 maintains the vertical edge of the first side panel 48 against the front panel 44.

As described above, the top panel 52 or lid is attached to the support frame. In an installed and closed position, the top panel 52 covers the entire top portion of the generator enclosure system 40. As depicted in FIG. 1, the top panel 52 extends from the front panel 44 to the back panel 46 and from the first side panel 48 to the second side 50. As shown in this embodiment, the top panel 52 mounts flush to the front panel 44, first side panel 48 and second side panel 50.

As assembled, the generator enclosure system 40 is a unified system that protects the internal components from the elements. Further, the generator enclosure system 40 forms three distinct chambers that allows for proper ventilation and cooling of the electronics of the control housing, engine 190, and alternator 192. The fan of the engine 190 functions to move the air through the first chamber 120, second chamber 122, and third chamber 124.

Outside air may be brought into the first chamber 120 through louvers 332 in the first side panel 48 and into the intake housing 154. From there, the air is pulled through the opening in the first bulkhead 100 and into the fan housing 202 by the fan. The air flows over the blades of the fan 202 and is pushed along a path D and through the second chamber 122. As the air flows through the second chamber 122 along the path D, the air flows over the engine 190. The air flowing over the engine 190 cools the engine 190 and ventilates the second chamber 122. The exhausted air then passes through the frame 85 via the cooling exhaust channel 220. From there the exhausted air is pushed out of the cooling exhaust channel 220 and through the louvers 332 of the second side panel 50 to the outside.

Outside air brought into the first chamber 120 may also be used for combustion. Air brought into the first chamber 120 is drawn through the combustion air inlet 176. Air is then pulled into the engine 190 for combustion.

Outside air may also be brought into the first chamber 120 through the control housing 142 through the louver 130 in the corner element 114. Air enters the intake duct 168 through the intake 167. The air is pulled through the first channeling 171 and the second channeling 172. As the air flows along a path A through the first channeling 171 and a path B through the second channeling 172, it flows across the control housing 142 electronics thereby cooling them. Air is then pulled out of the control housing 142 and second channeling 172 along path C into and through the transfer duct 170 by the engine fan. This air then combines with the air brought into the intake housing 154 as describe above.

Outside air for cooling may also be brought into the generator enclosure system 40 to cool the alternator 192 via alternator cooling duct 231. Air is drawn in through alternator cooling duct 231 and into the alternator housing 195 by the fan within the alternator housing 195. As the air flows over the alternator 192 within the alternator housing 195 it cools the alternator 192. The air is then pushed through the vents 193 in the alternator housing 195 and enters the flow of the second chamber 124 described above.

As described above, there are a number of internal components within the generator enclosure system. During the life of the system, service on the engine, alternator or other components may need to be conducted. Removal of the enclosure system may be necessary to access the specific area in need of service.

In order to access the interior of the generator enclosure system 40 for service or otherwise, an individual or technician may need to remove one or more of the front panel 44, back panel 46, first side panel 48, and/or second side panel 50. In order to remove the front panel 44, first side panel 48, and second side panel 50 to gain access to the interior, a specific order may be implemented.

First, a technician lifts the lid 52 of the generator enclosure system 40. The technician may place his/her hand under the top panel 52 at the front side 54 and lift. As the top panel 52 moves up, it pivots about the hinges 360 and moves up and horizontally back, away from the back panel 46. Once the top panel 52 is in the fully opened position, the technician may then begin removing the first side panel 48, second side panel 50, and front panel 44.

Second, the technician moves next to either the first side panel 48 or second side panel 50. In order to remove either of the first side panel 48 or second side panel 50, the technician may pull on the top edge bend 334 of the side panels 48, 50. Pulling the first side panel 48 or second side panel 50 up and away from the generator enclosure 40 removes the side panel. As the side panel is pulled up and away, the mounting posts of the front panel 44 and corner element 114 slide out of the mounting slots 336. Once the shank 270 of the mounting posts 127 clears the mounting slots 336, the side panel 48, 50 is free from attachment to the front panel 44 and corner element 114. The technician may remove the first side panel 48 and second side panel 50 and set them off to the side.

Lastly, the technician may remove the front panel 44 to access the first side 56 of the generator enclosure system 40. To remove the front panel 44, the technician first locates each of the locking mechanisms 280 on front panel 44. Using only their hands, the technician then lifts the lever 296. Lifting the lever 296 releases the lock of the retention element 288. The retention element 288 then pivots to the unlocked position, thereby releasing the bolt 118. The lever 296 and locking mechanism 280 is configured to be operated without a tool and by the hand of a technician.

When the locking mechanism 280 is unlocked, the front panel 44 may then be moved away in a horizontal direction or pivoted from the bulkhead 100 and frame 85. Once the top of the front panel 44 has cleared the bulkhead 100 and frame 85, the technician may lift on the front panel 44 and move it above the posts 72 retained in the edge bend 266 of the front panel 44. At this point the front panel 44 is free from the generator enclosure system 40.

It is contemplated that the back panel 46 may have the same configuration as the front panel 44 and therefore be removed in the same way as the front panel 44, as described above. Removing the back panel 46 would allow the technician access to the back side 55 of the generator enclosure system 40.

The panels of the generator enclosure system 40 may be reinstalled in a reverse order as described above. The installation of the panels may be facilitated without any tools. With the top panel 52 open, the technician first installs the front panel 44. The posts 72 on the front side of the generator enclosure system 40 are aligned with the apertures 268 of the front panel 44. The front panel 44 is lowered onto the posts 72. The top of the front panel 44 is then pivoted toward the bulkhead 100 and frame 85 in a horizontal direction until the retention element 288 engages the bolt 118 of the locking bolt 115. The technician then continues to move the front panel 44 toward the bulkhead 100 and frame 85. This motion causes the retention element 288 to pivot downward about the first pivot 298 point and into the U-channel. When the retention element 288 and bolt 118 reach the end of travel, the locking mechanism 280 locks the front panel 44 in place. In the embodiment depicted within the description, the back panel 46 is fixed in place. It is contemplated that the back panel 46 may be configured to be removable in the same manner as the front panel 44. In this instance, the same steps for removing the front panel 44 may be utilized with the back panel 46 as well. The back panel 46 may be installed before or after the front panel 44.

The technician may then assemble the side panels 48, 50. It is not material whether the first side panel 48 or the second side panel 50 is installed first, as the order of the first side panel 48 and the second side panel 50 are interchangeable. The side panels 48, 50, however, must be install only after the front panel 44 has been completely installed. The description provided will therefore be applicable to both the first side panel 48 and the second side panel 50. The description of installing the side panels 48, 50 will be described relating to the first side panel 48. The first side panel 48 is lifted by the technician. The mounting slots 336 on each side of the first side panel 48 are aligned with each of the shanks 271 of the mounting posts 127 on both the front panel 44 and adjacent corner element 114. The technician then slides the mounting slots 336 onto the shanks 271 to attach the first side panel 48 to the front panel 44 and corner element 114.

Once the first side panel 48 and second side panel 50 are attached in the above described method, the front panel 44, first side panel 48, corner elements 114, back panel 46 and second side panel 50 form a unitary enclosure. Lastly, the top panel 52 may be pivoted closed about the hinges 360, thereby covering the internal components of the generator enclosure system.

Figure 16:
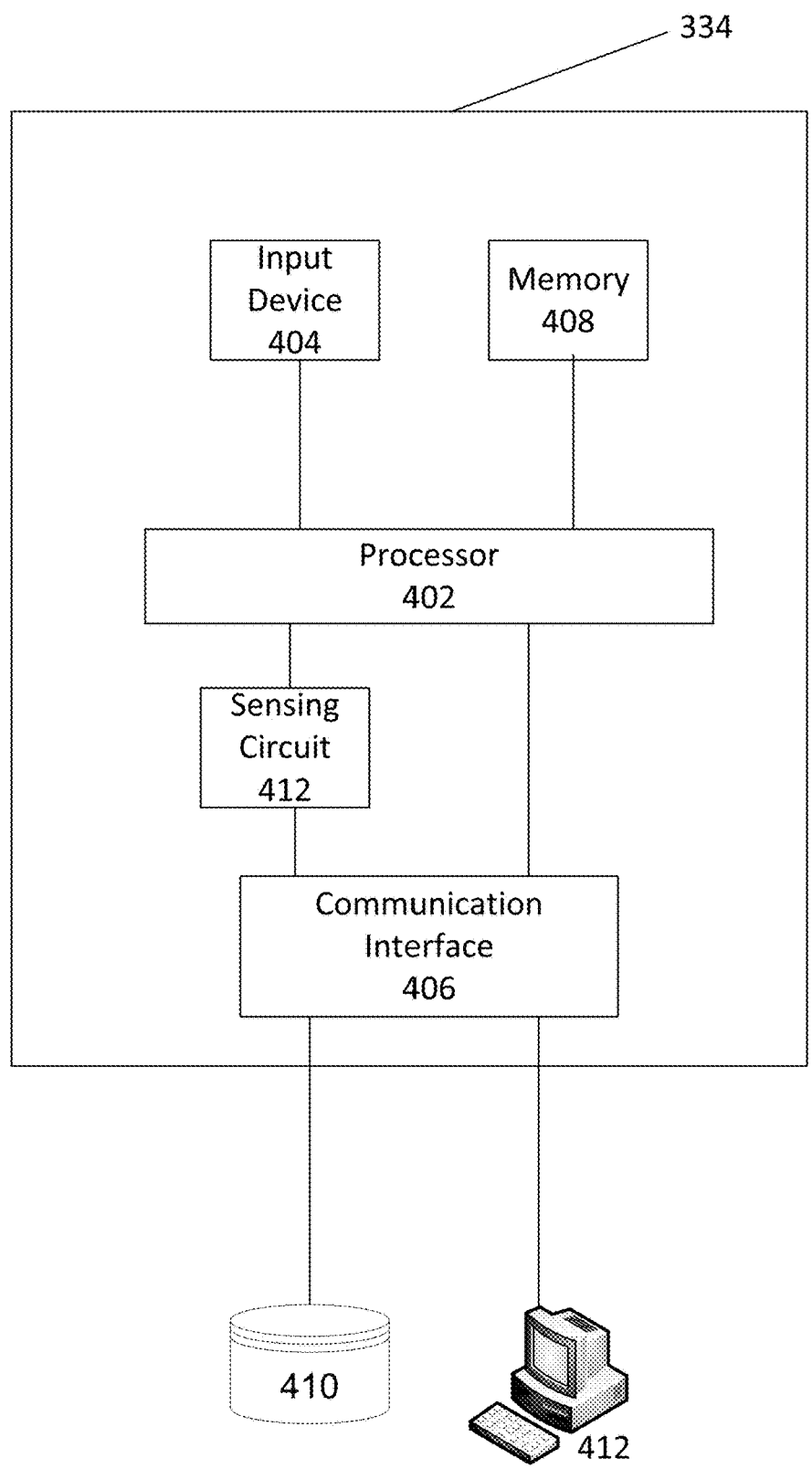
FIG. 16 illustrates a controller for a generator enclosure system.

Included within the generator enclosure system 40 may be a controller 400 as depicted in FIG. 16 for monitoring the attachment of the front panel 44, first side panel 48, corner elements 114, back panel 46 or second side panel 50 to determine if the generator enclosure system 40 has been assembled properly.

The controller 400 may include a processor 402, an input device 404, a communication interface 406, a memory 408, a sensing circuit 409, database 410, and a display 412. The controller 400 may receive data from sensors or other input devices. In one instance, the controller 400 may receive a signal from a sensor or other input devices. In one instance the controller 400 may receive a signal from a sensor indicating that the front panel 44 is not locked. In another instance the controller 400 may receive a signal that that one of the side panels has not been installed.

The controller 400 may convey this identification using a display, indicator light, or sound emitting device. The display, indicator light, or sound emitting device may be mounted to the external portions of the generator enclosure system 40 or may alternatively be in communication with an external device in the possession of the technician.

Any of the techniques described above may be embodied on a non-transitory computer readable medium, which may be a single medium or multiple media, such as a centralized or distributed database, and/or associated caches and servers that store one or more sets of instructions. The term "non-transitory computer-readable medium" shall also include any medium, except a signal per se, that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored. The computer-readable medium may be non-transitory, which includes all tangible computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

We claim:

1. A generator enclosure system comprising:
   a base supporting a generator;
   a first support element connected to the base and including a front and a back, wherein the front includes a locking bolt;
   a second support element connected to the base;
   a front panel removably connected to the first support element by a locking mechanism including a lever, wherein the locking mechanism is configured to interact with the locking bolt to lock the front panel to the first support element;
   a back panel configured to attach to the first support element, the second support element, or the first support element and the second support element;
   a first side panel removably connected to a connecting element of the front panel on a first side of the generator enclosure system; and
   a second side panel removably connected to a connecting element of the front panel on a second side of the generator enclosure system, wherein the first support element and the second support element define a first chamber, a second chamber, and a third chamber, the third chamber being for ventilation within the generator enclosure system.

2. The generator enclosure system of claim 1, wherein the locking mechanism is unlocked by operation of the lever.

3. The generator enclosure system of claim 2, wherein operation of the lever is performed without a tool.

4. The generator enclosure system of claim 1, wherein the second support element further includes a second locking bolt and the front panel further includes a second locking mechanism configured to interact with the second locking bolt to lock the front panel to the first support element.

5. The generator enclosure system of claim 1, wherein a control panel is located within the first chamber, the generator is located within the second chamber, and an exhaust duct is located within the third chamber.

6. The generator enclosure system of claim 1, wherein the back panel further comprises a first corner element and a second corner element, wherein each of the first corner element and second corner element include a connecting element,
   wherein the first side panel and second side panel each include a first side and a second side, each side including a connecting element,
   wherein the connecting element of the first side of the first side panel is removably connected to the front panel and the connecting element of the second side of the first side panel is removably connected to the first corner element, and
   wherein the connecting element of the first side of the second side panel is removably connected to the front panel and the connecting element of the second side of the second side panel is removably connected to the first corner element.

7. The generator enclosure system of claim 1, wherein the base includes at least one mounting post and the front panel includes at least one aperture configured to accept the mounting post in the installed state.

8. The generator enclosure system of claim 1, wherein the locking mechanism includes a retention element configured to pivotably engage the locking bolt to retain the front panel against the first support element.

9. A generator enclosure system comprising:
   a base;
   a first support element including a locking bolt;
   a second support element;
   a front panel including a locking mechanism;
   a back panel;
   a first side panel configured to connect to the front panel on a first side of the generator enclosure system; and
   a second side panel configured to connect to the front panel on a second side of the generator enclosure system,
   wherein the locking mechanism is configured to interact with the locking bolt to lock the front panel to the first support element by retaining the locking bolt within a retention element of the locking mechanism, wherein the first support element and the second support element define a first chamber, a second chamber, and a third chamber, the third chamber being for ventilation within the generator enclosure system.

10. The generator enclosure system of claim 9, wherein operation of the retention element retaining the locking bolt is performed without a tool.

11. The generator enclosure system of claim 9, wherein the first supporting element and second supporting element extend from the back panel to the front panel and from a top panel to the base.

12. The generator enclosure system of claim 9, wherein the first side panel and second side panel each include a first side and a second side, each side including a connecting element configured to connect to a corresponding connecting element on each of the front panel and back panel.

13. The generator enclosure system of claim 9, wherein the base includes at least one mounting post and the front panel includes at least one aperture configured to accept the mounting post in the installed state.

14. A generator enclosure system comprising:
a base;
a first support element connected to the base and including a front and a back, wherein the front includes a first locking member;
a second support element connected to the base;
a front panel removably connected to the first support element by a second locking member, wherein the second locking member is configured to interact with the first locking member to lock and unlock the front panel to the first support element without a tool;
a back panel configured to attach to the first support element, the second support element, or the first support element and the second support element;
a first side panel removably connected to a connecting element of the front panel on a first side of the generator enclosure system; and
a second side panel removably connected to a connecting element of the front panel on a second side of the generator enclosure system,
wherein the first support element and the second support element define a first chamber, a second chamber, and a third chamber, the third chamber being for ventilation within the generator enclosure system.

* * * * *